Sept. 3, 1940. E. F. BESSEY Re. 21,547
SOCKET FOR VACUUM TUBES AND THE LIKE
Original Filed Jan. 14, 1933
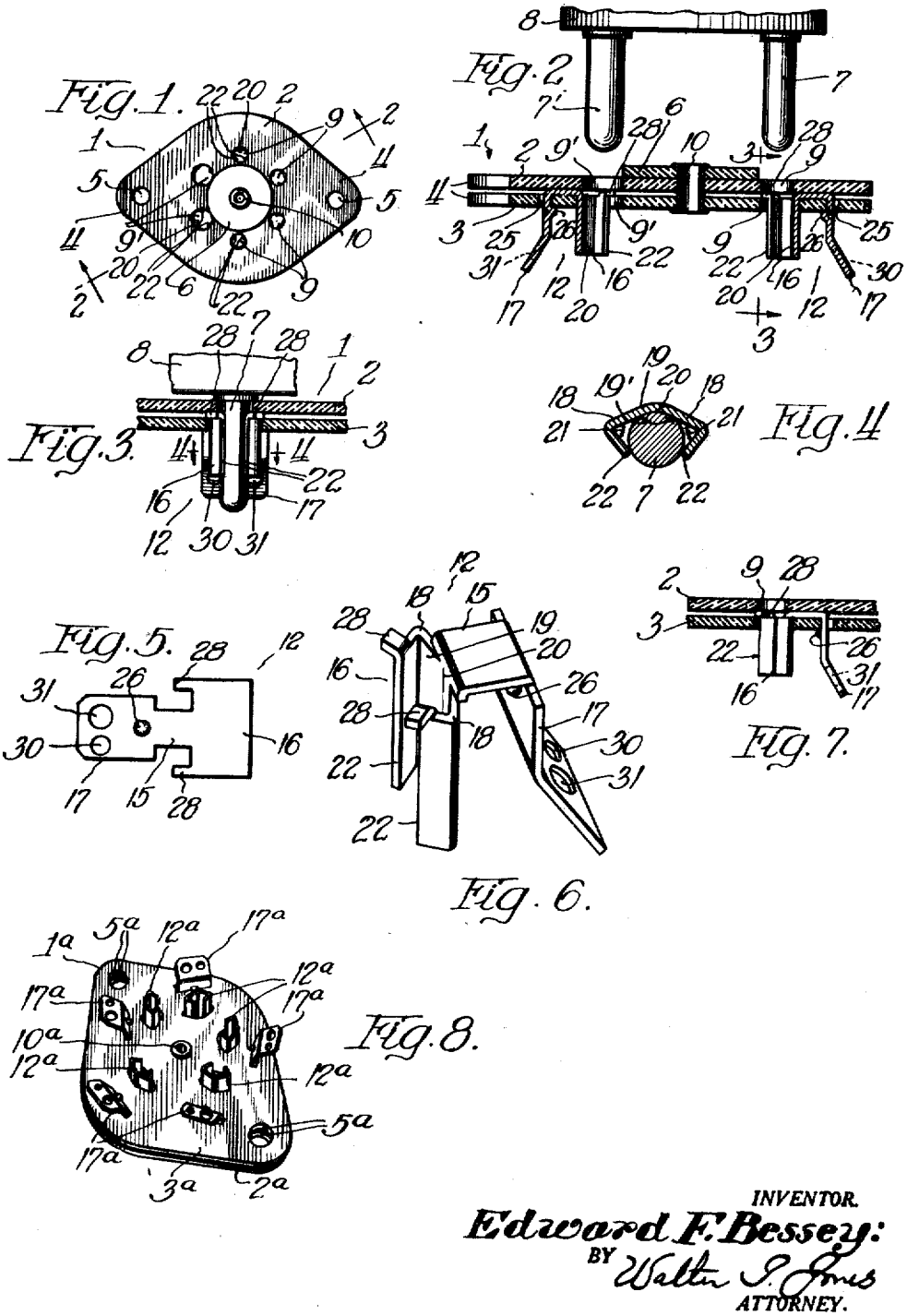
INVENTOR.
Edward F. Bessey:
BY Walter S. Jones
ATTORNEY.

Reissued Sept. 3, 1940

Re. 21,547

UNITED STATES PATENT OFFICE 21,547

SOCKET FOR VACUUM TUBES AND THE LIKE

Edward F. Bessey, Crystal Lake, Ill., assignor, by mesne assignments, to Cinch Manufacturing Corporation, a corporation of Illinois Original No. 2,017,940, dated October 22, 1935, Serial No. 651,691, January 14, 1933. Application for reissue October 19, 1937, Serial No. 169,888

15 Claims. (Cl. 173—328)

This invention relates to electric connectors and has for its principal object the provision of an improved socket for vacuum or thermionic tubes, and more particularly an improved contact for making connection with the cylindrical rod-like studs or pin terminals of a vacuum tube or other device having such terminals.

An important and advantageous feature of the contact of the present invention resides in the fact that the body portion of the contact is in the form of a thin sheet metal spring member which extends longitudinally along the rod-like contact and makes contact with the rod-like contact member along more than two lines of contact extending longitudinally of the contact so that relative endwise movement of the rod-like contact clears more than two lines of contact along the body portion of the contact. The endwise movement of the prong or rod-like contact causes a highly beneficial wiping or cleaning effect along these lines of contact due to the relatively limited areas of engagement which the contact of the present invention has upon the surface of the pin terminal.

Another important and advantageous feature resides in the fact that the lines of contact not only are increased to more than two but are arranged to grip and hold the pin terminals or rod-like contacts and the tube carrying such contacts firmly in place in the radio set and against vibrating loose. The virtue of this, as has been amply demonstrated by actual commercial use, is that the tubes may be assembled in the set in the manner to provide the best results and the set may be shipped or distributed with the tubes in place and without danger of their vibrating loose in shipment. The purchaser is thus assured of the best possible results, and this feature also has great virtue in connection with radio sets installed in automobiles or other moving vehicles subject to vibration. Under such circumstances, the contact of the present invention will hold the rod-like contacts firmly in place and against loosening by the vibration of the vehicle or other object upon which the set is arranged.

In the form of the invention herein illustrated, certain of the lines of contact are formed by edges which have knife-edge contact with the pin terminal. This reduces contact resistance and, although it provides an additional advantage in the present contact, it is, in itself, not an essential feature of the present invention.

The real virtues are the high unit pressures obtained along lines extending in the direction of insertion or removal of the rod-like contact, the increased contact, and thereby the increased electrical efficiency produced by providing more than two lines of contact, and the gripping and holding of the rod-like contact and tube firmly in place and against vibrating loose which is obtained by providing more than two lines of contact and arranging the same according to the present invention.

Another feature resides in the fact that the contact of the present invention requires very little material and is simple and inexpensive in construction.

While the particular contact which I shall describe hereinafter in connection with the drawing provides three lines of contact with the pin or rod-like terminal of the tube, it is to be understood that the present invention is not limited to three lines of contact, but is intended to include four lines of contact or any desired number of lines of contact greater than two and arranged to provide the wiping or cleaning and gripping actions of the present invention.

In order to acquaint those skilled in the art with the construction and operation of the present invention, I shall now describe an embodiment of the invention in connection with the accompanying drawing, in which:

Figure 1 is a top plan view of a socket embodying the present invention;

Figure 2 is an enlarged sectional view taken on the line 2—2 of Figure 1 and showing a radio tube in spaced relation therewith;

Figure 3 is a fragmentary detail section taken on the line 3—3 of Figure 2 with a tube prong inserted;

Figure 4 is a detail cross-section through one of the rod-like contacts and the engaging and gripping portion of the socket contact along the line 4—4 of Figure 3;

Figure 5 is a view showing one of the tube contacts in flat form after shaping but before bringing the same to the form shown in Figure 6;

Figure 6 is a perspective view of one of the tube contacts;

Figure 7 is a fragmentary section through the socket similar to Figure 2 but showing the entire contact element in elevation; and Figure 8 is a perspective view of the bottom of another tube socket embodying the present invention.

Referring to the drawing, the socket shown in Figures 1 and 2 includes a base 1 comprising upper and lower thin plates 2 and 3 formed of fiber or other suitable or preferred insulating material.

The insulating plates 2 and 3 have mounting ears 4 provided with registering perforations 5 for receiving screws or other suitable fasteners for attaching the socket to the panel or other support. A guide disc 6, also preferably of fiber or other suitable insulating material, is mounted on the upper side of the plate 2 substantially centrally thereof to guide the prongs or rod-like contacts 7, 7' of the vacuum or thermionic tube or other electrical device, shown fragmentarily at 8, into the holes 9, 9'. A hollow rivet 10 passes centrally through the plates 2 and 3 and through the disc 6 and is headed over at its opposite ends to clamp the plates 2 and 3 rigidly together and the disc 6 rigidly in place.

The holes 9 are arranged in pairs through the plates 2 and 3 in registration as will hereinafter appear, and the holes 9' are correspondingly arranged in pairs through the plates 2 and 3. In the embodiment of Figures 2 and 3, these registering pairs of holes 9, 9' are uniformly spaced circularly about the disc 6 with their edges coinciding with the edge or periphery of the disc 6. In inserting the rod-like contacts or prongs 7, 7' into the holes 9, 9' the tube 8 is brought to the position in which the ends of the prongs 7, 7' circumscribe the guide disc 6. Hence the guide 6 is a suitable internal guide for the prongs or rod-like contacts 7, 7' to guide them for circumferential motion until they register with the desired holes 9, 9'. The prongs 7, 7', upon registration with the desired holes 9, 9', are projected endwise or longitudinally through the registering holes in the plates 2 and 3 and into engagement with the contacts 12. To remove the tube from the socket, it is moved away from the base 1 to withdraw the prongs 7, 7' endwise from the contacts 12 and holes 9, 9'.

In order to assure that the tube 8 will be placed in the socket 1 properly, that is, with the proper prongs 7, 7' in engagement with the proper contacts 12, two of the prongs are of larger diameter, as indicated at 7' in Figure 2, than the other four prongs 7, and two of the holes, as indicated at 9', are of correspondingly larger diameter than the other four holes 9. In inserting the tube into the socket, the operator need not concern himself further than to set the ends of the terminal 7, 7' on the plate 2 over the guide disc 6 and then turn the tube axially until the proper orientation is had. This is determined by the diameter of the holes 9, 9' and the diameter of the terminals 7, 7', respectively, these diameters being such as to enable the tube to be applied to the socket in only one circumferentially defined relative position.

One of the contacts 12 is positioned at each of the holes 9, 9'. These contacts preferably are made of spring brass or German silver, although they may be of bronze or any other suitable spring material. They are blanked out in the flat to the configuration shown in Figure 5 by a suitable blanking die to form the intermediate mounting or seat portion 15 with the integral contact making portion 16 at one end and the integral connecting or terminal lug 17 at the opposite end. After blanking out the contact in flat form to the configuration shown in Figure 5, the contact making portion 16 is turned down to lie at substantially right angles to the mounting or seat portion 15. The terminal lug 17 is turned down to substantially the position shown with its lower end turned out slightly for ease in connecting the desired leads or conductors thereto. The opposite sides 18 of the back 19 of the down-turned contact making portion 16 are turned forwardly at an obtuse angle 19' to form a vertical median line of contact 20 and the opposite ends of these forwardly turned sides 18 are turned in at acute angles 21 to present two vertical edges 22.

The edges 22 present two relatively sharp lines of contact against each of the rod-like contacts or terminals 7, 7' longitudinally thereof and the vertical median line 20 at the back 19 presents a third line of contact against each of the rod-like contacts or terminals 7, 7' upon projection of the terminals 7, 7' into engagement with the contacts 12. The three lines of contact 20, 22, 22 are spaced apart around the rod-like contacts 7, 7' distances less than the thickness or diameter of the rod-like contacts to center said contacts between them, and the lines of contact 20, 22, 22 of each contact are preferably normally pressed together so that they will be spread slightly and will be pressed or tensioned tightly by the springiness of the contacts 12 against the surfaces of the rod-like contacts upon projection of the same therebetween.

When the rod-like contacts 7, 7' are inserted into the socket, they are guided longitudinally by the edges 22, 22 and the third line of contact 20 which are pressed or tensioned firmly against the surfaces of the prongs of the tube.

The presentation of the two edges 22, 22 of the sheet metal spring contacts and the third longitudinal line of contact 20 tends to develop high unit pressure along the three lines of engagement 20, 22, 22, thereby gripping and holding the rod-like contacts firmly in place so that the tubes may be assembled in the set in the manner to provide the best results and the set shipped or distributed with the tubes in place and without danger of their vibrating loose in shipment. As already explained, this firm gripping and holding of the terminals 7, 7' also has virtue in connection with sets installed in automobiles or other moving vehicles subject to vibration. Under such circumstances, this gripping engagement with the rod-like contacts will hold these contacts firmly in place and against loosening by the vibration of the vehicle or other object upon which the set is arranged.

The presentation of the two edges of the sheet metal and the third line of contact tends to scour or clean three lines of contact on each stud. Any dirt or scale which might tend to become interposed will be cut away or rubbed off and displaced from the lines of contact. The terminal studs 7, 7' are guided initially by the holes 9, 9' and for any springiness or wobbling action of the studs 7, 7' permitted by the guide holes 9, 9' the contacts 12 may provide sufficient resiliency to permit the same without impairing the contacting and gripping action and without permanent deformation of the springs. And the relatively sharp edges presented by the two edges 22, 22 reduces the contact resistance. The contact making portions 16 are, in effect, self-aligning or floating in action.

The contact clips 12 may be tin-plated for ease in soldering and, in making up the socket, the contacts 12 are applied to the insulating plate 3 by passing the down-turned contact making portions 16 through the holes 9, 9' in the plate 3 and the terminal lugs 17 pass through openings 25 in the plate 3. The mounting or seating portions 15 are snapped down to lie substantially flat upon the upper surface of the plate 3.

In order to hold the contact springs 12 in place on the lower base plate 3 until the upper base plate 2 is applied and secured in place, the terminal lugs 17 have small protuberances 26 which may be center-punched therein. These protuberances are adapted to be snapped beneath the lower base plate 3 in applying the contacts 12 thereto and hold the contacts in place until the plate 2 is applied and secured to the plate 3. This retention is sufficient to permit handling and even turning the plate 3 upside down without displacing the contacts 12. The openings 9, 9′ in the plate 3 are shaped to receive the downturned contact making portion 16 and are preferably positioned to dispose normally the lines of contact 20, 22, 22 slightly inwardly of the circular openings 9 in the upper plate 2, as shown in Figure 1.

The plate 2 is applied upon the top of the plate 3 over the mounting or seating portions 15 of the contacts with the openings 9, 9′ in register with the openings 9, 9′ in the plate 3 and with the openings 5 in register, and is clamped rigidly to plate 3 by the central rivet 10. For the purpose of holding the upper ends of the contact making portions 16 in place, or at least to prevent undue downward displacement of these contact making portions 16, the upper ends thereof are provided with integral lugs 28 which are turned out and held between the plates 2 and 3. The lower ends of the terminal lugs 17 have openings 30, 31 for attachment of the desired leads or conductors thereto. These openings 30, 31 are shown of different sizes for attachment of smaller leads or conductors to the smaller openings 30, and if the leads or conductors are larger they may be fastened to the larger openings 31. The contact clips 12, disposed adjacent the two larger openings 9′ for cooperation with the two larger prongs 7′ are preferably correspondingly larger than the clips at the smaller openings 9 for cooperation with the smaller prongs 7, but are otherwise substantially identical therewith.

Aside from the other advantages already referred to, the contact clip 12 of the present invention requires very little material. And it is brought to form in a simple and inexpensive manner. In fact, the contact making portion 16 and the terminal lug 17 may be turned down and the terminal lug and contact making portion brought to the form shown in Figure 6 in a single operation, or at least by succeeding operations which are simple to perform.

The embodiment of Figure 8 is substantially the same as that shown in Figures 1 to 7, except that in this case the socket 1a is provided with five contacts 12a for cooperation with a five-pronged tube and the proper disposition of the prongs of the tube in this socket is determined by spacing the contacts 12a, or at least certain of these contacts, different distances circularly about the guide disc (not shown). The registering perforations in the plates 2a and 3a for receiving screws or other suitable fasteners for attaching the socket to the panel or other support are indicated at 5a, and the terminal lugs of the contacts 12a are indicated at 17a. The rivet for clamping the plates 2a and 3a rigidly together and the guide disc in place is indicated at 10a. The formation of the contact engaging portions of the contacts 12a is substantially the same as in the preceding embodiment and the fastening of these contacts to the base 1a is substantially the same as before. In this case, the prongs of the tube being all of the same thickness, the contacts 12a may all be of the same size.

It is to be understood that the provision of a contact having more than two lines of contact with the rod-like terminal or prong of the tube or other device is an important aspect of the present invention, and that the form of the contact may be varied within the scope of the invention. I do not intend, therefore, to be limited to the precise details shown or described.

I claim:

1. A socket for receiving and establishing electric contact with a rod-like contact, including an insulating base, said base having an aperture through which said rod-like contact may be projected, and a unitary contact spring, said spring having a mounting portion adapted to lie on a portion of said base adjacent said aperture to support said spring, said spring having a contact making portion extending through said aperture and depending below said base, said contact making portion having a back portion formed as a prolongation of said mounting portion, said portions extending only from the sides of said back portion and being bent to form an enclosed region with a pair of edges separated throughout their entire length, said edges being perpendicular to said base and parallel with the line of movement of said rod-like contact and being adapted to tightly embrace said rod-like contact, said side portions and back portion together providing a plurality of parallel line contacts and means for supporting at least one of said side portions from said base to prevent said contact making portion from bending at the junction of said mounting and contact making portions upon insertion of said rod-like contact.

2. The structure of claim 1, wherein said last named supporting means comprises at least one ear projecting from the edge of a side portion adjacent said base through said aperture to the other side of said base and bent over to lie along said base.

3. The structure of claim 1, wherein the free edge of said mounting portion of said contact spring is extended through and below said base to form a soldering lug.

4. The structure of claim 1, wherein said last named supporting means comprises an ear extending from the edge adjacent said base of each side portion, said ears projecting through said base and being bent to lie along said base, and wherein the free edge of said mounting portion of said contact spring is projected to form a soldering lug.

5. The structure of claim 1, wherein said base is provided with a slot adjacent said aperture and the free edge of said mounting portion of said contact spring is projected through said slot below said base to form a soldering lug, and a protuberance is provided in said soldering lug immediately below said base to form a stop against upward displacement of said soldering lug.

6. The structure of claim 1, wherein said base is provided with a narrow slot adjacent said aperture and the free edge of the mounting portion of said contact spring is projected through said slot to form a soldering lug, a protuberance on said soldering lug below said base and adapted to prevent said lug from casual displacement through said slot after said spring is in position, and wherein said last named supporting means comprises an ear extending from the edge adjacent said base of each side portion of said contact portion, each ear projecting through said base and being bent to lie along said base.

7. A socket for receiving and establishing electric contact with a plurality of rod-like contacts, including an insulating base having a plurality of apertures therethrough through which said rod-like contacts may project, a unitary contact spring for each aperture, said contact spring having a mounting portion adapted to lie on a portion of said base adjacent said aperture to support said spring, said spring having a contact making portion extending through said aperture and depending below said base, said contact making portion having a back portion formed as a prolongation of said mounting portion, side portions extending only from the sides of said back portion and being bent to form an enclosed region with a pair of edges separated throughout their entire length, said edges being perpendicular to said base and parallel with the line of movement of said rod-like contact and being adapted to tightly embrace said rod-like contact, said side portions and back portion together providing a plurality of parallel line contacts and means for supporting at least one of said side portions from said base to prevent said contact making portion from bending at the junction of said mounting and contact making portions upon insertion of said rod-like contact, an additional insulating base superimposed on said first base and having apertures aligned with said first base, the apertures on said two bases being arranged to enclose a region, and means within said region for maintaining said two bases in assembled relationship.

8. The structure of claim 7, wherein said supporting means comprises an ear extending from the edge adjacent said first insulting base of at least one side portion, said ear projecting through said first base and being bent to lie between said two bases.

9. The structure of claim 7, wherein said first base is provided with a narrow slot adjacent each aperture, and wherein the free edge of said mounting portion of said contact spring is projected through said slot to form a soldering lug.

10. The structure of claim 7, wherein said first base is provided with a narrow slot adjacent each aperture, the free edge of the mounting portion of each contact spring is projected through each slot to form a soldering lug, and wherein said supporting means comprises an ear extending from the edge adjacent said first base of each side portion of the contact portion, each ear extending through said first base only and being bent to lie between said two bases.

11. A socket for receiving and establishing electric contact with the cylindrical prongs of a vacuum tube base or the like, including an insulating base, said base having a plurality of apertures through which the prongs may be projected, and a unitary contact spring for each aperture, said spring having a mounting portion adapted to overlie a portion of said base adjacent said aperture to support said spring, said spring having a contact making portion extending through said aperture and depending below said base in a line perpendicular to said base, said contact making portion having a solid integral back portion formed as a prolongation of said mounting portion, side portions extending only from the sides of said back portion of said contact making portion and being bent to form an enclosed region with a pair of edges separated throughout their entire length, said edges being perpendicular to said base and parallel with the line of movement of said rod-like contact and being adapted tightly to embrace said rod-like contact, the entire contact making portion having its upper portion within said aperture and being so shaped as to define a generally cylindroidal space with the axis perpendicular to the base, said contact spring being adapted to tightly grip the cylindrical prong of a vacuum tube base, between the two open edges and the back portion of said contact making portion.

12. The structure of claim 11, wherein the insulating base is provided with a narrow slot adjacent each aperture and wherein each contact spring has a mounting portion extended through said slot to form a soldering lug.

13. The structure of claim 11, wherein said insulating base is provided with a narrow slot adjacent each aperture, and wherein the mounting portion of said contact spring is projected through said aperture to form a soldering lug and wherein a protuberance is provided in a portion of the soldering lug immediately below said insulating base.

14. The structure of claim 1, wherein the cross-section of said contact making portion is of such shape that a rod-like contact passing therethrough makes the line contacts therewith only at the back portion and the free edges of the side portions.

15. A socket for receiving and establishing electric contact with a rod-like contact, including an insulating base, said base having an aperture through which said rod-like contact may be projected, and a unitary contact spring, said spring having a mounting portion adapted to lie on a portion of said base adjacent said aperture to support said spring, said spring having a contact making portion extending through said aperture and depending below said base, said contact making portion having a back portion formed as a prolongation of said mounting portion, side portions directly connected only to the sides of the back portion and flexing thereabout upon axes longitudinal thereof, said side portions being substantially perpendicular to the base and extending parallel with the line of movement of said rod-like contact and being adapted to make contact with said rod-like contact along lines perpendicular to the base, said side portions and back portion together providing a plurality of parallel line contacts and means for supporting at least one of said side portions from said base to prevent said contact making portion from bending at the junction of said mounting and contact making portions upon insertion of said rod-like contact.

EDWARD F. BESSEY.

CERTIFICATE OF CORRECTION.

Reissue No. 21,547. September 3, 1940.

EDWARD F. BESSEY.

It is hereby certified that error appears in the printed specification of the above numbered patent requiring correction as follows: Page 3, second column, line 26, claim 1, for the word "said" read --side--; and that the said Letters Patent should be read with this correction therein that the same may conform to the record of the case in the Patent Office.

Signed and sealed this 8th day of October, A. D. 1940.

Henry Van Arsdale,
Acting Commissioner of Patents.

(Seal)